June 28, 1960

E. C. LUNDEBERG 2,942,640

LOCK NUT HAVING A DEFORMABLE MEMBER
CONTAINING LIQUID SEALANT

Filed May 16, 1958

INVENTOR
EDGAR C. LUNDEBERG

BY
Byerly, Townsend, Watson & Churchill
ATTORNEYS.

United States Patent Office 2,942,640
Patented June 28, 1960

2,942,640
LOCK NUT HAVING A DEFORMABLE MEMBER CONTAINING LIQUID SEALANT

Edgar C. Lundeberg, 182 S. Whitney St., Hartford, Conn.

Filed May 16, 1958, Ser. No. 735,797

10 Claims. (Cl. 151—7)

The present invention relates to screw threaded fastening means and aims to provide certain improvements therein.

It has been heretofore proposed, particularly where vibration is a problem, to use a liquid sealant which has the property of hardening automatically with little shrinkage in joints between closely fitted metal parts, such as a nut on a bolt, to form a strong heat and oil resistant plastic seal between such parts. One such liquid sealant is manufactured and sold by the American Sealants Company of Hartford, Conn., under the trademark "Loctite." My best information is that Loctite is a petrochemical based plastic which is made in various grades whereby it is possible to obtain a wide range of break-loose torque from a mild drag to a lock exceeding the torsional strength of the fastener. Loctite will harden in the absence of air while in contact with a metal surface, which under such conditions acts as a catalyst for the sealant. In liquid form Loctite resembles a thick petroleum lubricating oil and when hardened it is a translucent plastic whose properties range from a tough hard amber-like material to a soft flexible material which resembles art gum. The manufacturer's recommended modes of using Loctite for securing nuts on bolts are (1) to apply a nut on a bolt in locking engagement and then through a dispensing nozzle apply the Loctite to the top of the nut at the mating threads and permit the sealant to seep down between the threads; (2) to apply the sealant to the threads of the nut during tumbling; (3) to dip the free end of a bolt into the sealant and depend upon the movement of the nut over the bolt to carry a film of sealant between the parts when assembled, and (4) to brush the sealant onto the interior threads of a nut or over the threaded part of a bolt, which nut and bolt are to be engaged in locking relation. Regardless of which of the recommended procedures are employed, it will be apparent that they are either time consuming or messy or both, or do not provide sufficient sealant between engaged threads to form a satisfactory bond.

The object of the present invention is to utilize the advantages of a liquid sealant such as Loctite and the like as a means for locking nuts onto bolts without the concomitant objections aforementioned.

A further object is to provide a simple and economical means of applying any desired amount of break-loose locking torque to all types and sizes of ordinary threaded fasteners.

A further object is to provide a self-contained lock nut for use in applications where vibration is a problem, said nut containing a sealant of the character set forth which will bond to the bolt with sufficient tenacity to prevent the nut working loose even under the severest conditions of vibrations.

A still further object is to provide a self-contained lock nut with a predetermined break-loose torque required to remove the nut from a bolt.

The foregoing and other objects of the invention, not specifically enumerated, I accomplish by providing on a screw threaded fastener and particularly within a nut in contact with the threads thereof, a deformable member containing a liquid plastic sealant, which has the property of hardening automatically with little shrinkage by the catalytic action of the metal surfaces which acts as a stabilizer in the absence of air to form a tough plastic bond. The invention will be better understood from the detailed description which follows when considered in connection with the accompanying drawing wherein:

Figure 1:
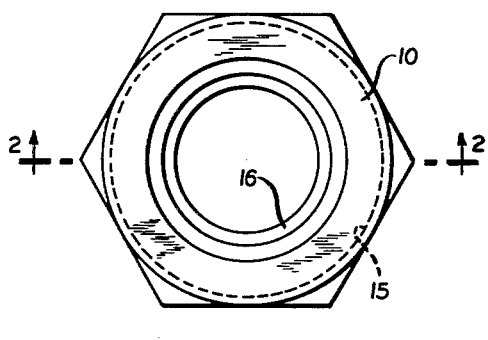
Fig. 1 is a top plan view of a nut embodying my invention.
Figure 2:
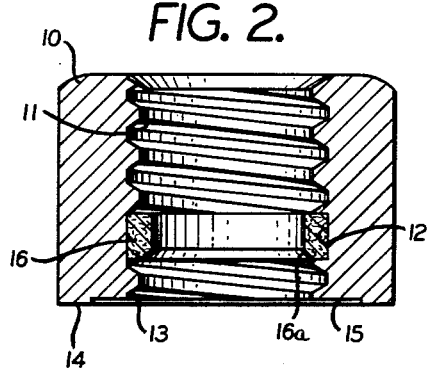
Fig. 2 is a diametrical section taken along the plane of the line 2—2 of Fig. 1.
Figure 3:
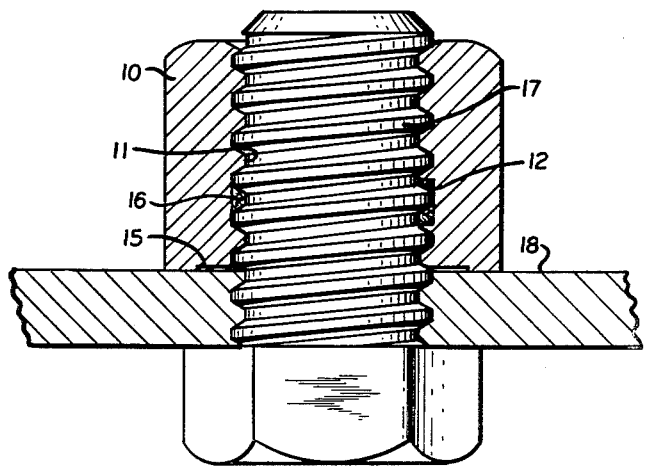
Fig. 3 is a diametrical sectional view of an assembly of a bolt and nut embodying my invention, the bolt being shown in elevation.
Figure 4:
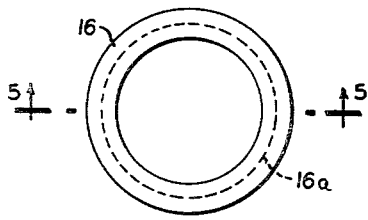
Fig. 4 is a top plan view of a carrier member for the sealant embodying my invention.
Figure 5:
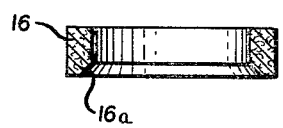
Fig. 5 is a section taken along the plane of line 5—5 of Fig. 4.

Referring to the drawing, the reference numeral 10, represents a conventional nut having a screw thread 11, a part of which is cut away to provide an internal annular groove 12 in proximity to the leading end 13 of the thread. At the leading end face 14 of the nut there is formed a shallow groove 15.

Mounted within the groove 12 is an annulus 16 which is preferably chamfered as shown at 16a, formed of an absorbent, deformable and preferable elastic material such as felt, sponge rubber, plastic foam, or the like, which is saturated with a sealant which has the property of hardening automatically with little shrinkage by the catalytic action of the metal surface which acts as a stabilizer in the absence of air to form a tough plastic seal. One such sealant material is Loctite which is manufactured and sold by the American Sealants Company of Hartford, Conn. The sealant is now made in five grades which when plasticized and hardened will provide a break-loose torque between threaded members from a mild drag to a lock exceeding the torsional strength of the fastener.

The annulus 16 may be saturated with the sealant in any desired manner either before or after positioning within the annular groove 12 with the chamfered edge 16a facing the leading end of the screw thread 11. By virtue of the absorbent, deformable, elastic character of the annulus 16 it will hold within the groove and keep the sealant from spreading. The sealant will not harden until the nut is engaged on a bolt 17, in the course of which operation the sealant is squeezed from the annulus to contact substantial areas of the threads on the nut and bolt and in fact may seep down into the groove 15 at the leading end face of the nut to contact a bearing surface 18 against which the nut may engage. The sealant when confined in engaged relationship of the nut and bolt, out of contact with the air and in contact with the steel surfaces will be converted in less than 10 minutes from its liquid to a solid state. In the solid state it will continue to harden and gain strength on further standing and will reach its maximum strength at room temperature in a few days. More than 50% of its final strength will be attained in about 6 hours at 72° F., and in about 3 hours at 90° F. In this stage the assembly will usually withstand handling. Hardening can be accelerated by heat and will be complete in about 15 minutes at 212° F. Best results however, are obtained when the treated joint is allowed to set at room temperature for at least 30 minutes before heating.

Nuts with the self-contained saturated annulus may be tumbled without fear of loss of the sealant and when packaged will have a shelf life of at least 6 months without deterioration or loss of bonding characteristic.

While I have shown and described a preferred embodiment of my invention it is to be understood that changes in details of construction and in the use of sealants other than Loctite having analogous properties may be used without departing from the spirit of the invention as hereinafter claimed.

What I claim is:

1. A metal threaded fastener element having in contact with at least a portion of the thread thereof a deformable member containing a liquid sealant having the property of bonding to the fastener element and hardening by the catalytic action of the metal surface in the absence of air, said sealant being adapted to be expressed from said deformable member into contact with the threads of the fastener element and into contact with the threads of a second threaded fastener element when the two fastener elements are threaded over one another.

2. A metal threaded fastener element having in contact with at least a portion of the thread thereof, a deformable absorbent material saturated with a liquid sealant having the property of bonding to the metal element and hardening by the catalytic action of the metal surface in the absence of air.

3. A metal threaded fastener element according to claim 2 wherein the deformable, absorbent material is elastic and is held by its elasticity onto the fastener element.

4. A metal threaded fastener element according to claim 3 wherein the deformable, absorbent material is of annular form.

5. A metal nut provided internally with a deformable ring-like member containing a liquid sealant adapted to be expressed from the ring-like member into contact with the thread on a bolt when screwed thereon, said sealant having the property of bonding to metal and hardening by the catalytic action of the metal surface with the sealant in the absence of air.

6. A metal nut provided internally with a ring of deformable absorbent material saturated with a liquid sealant having the property of remaining liquid in the presence of air and of bonding to the nut and hardening by the catalytic action of the metal surface with the sealant in the absence of air.

7. A metal nut according to claim 6 wherein the leading end face of the nut is formed with a shallow groove of larger diameter than the bore of the nut in open communication with the bore of the nut.

8. A metal nut according to claim 6 wherein a portion of the internal thread is cut away to form an annular groove within which is held the saturated ring of absorbent material.

9. A metal nut according to claim 8 wherein the ring of absorbent material is elastic and has an outer diameter larger than the minimum diameter of the nut thread.

10. A metal nut according to claim 8 wherein the annular groove in the nut is adjacent the leading end of the screw thread.

References Cited in the file of this patent

UNITED STATES PATENTS

| 2,286,336 | Brooke | June 16, 1942 |
| 2,360,370 | Schroeter | Oct. 17, 1944 |

FOREIGN PATENTS

| 514,296 | Canada | July 5, 1955 |